March 20, 1956 R. S. HUNTER 2,739,246
EXPOSURE HEAD FOR PHOTOMETRIC COMPARATOR INSTRUMENTS
Filed June 8, 1950 2 Sheets-Sheet 1

INVENTOR:-
Richard S. Hunter,

BY
Pierce, Scheffler & Parker,
ATTORNEYS.

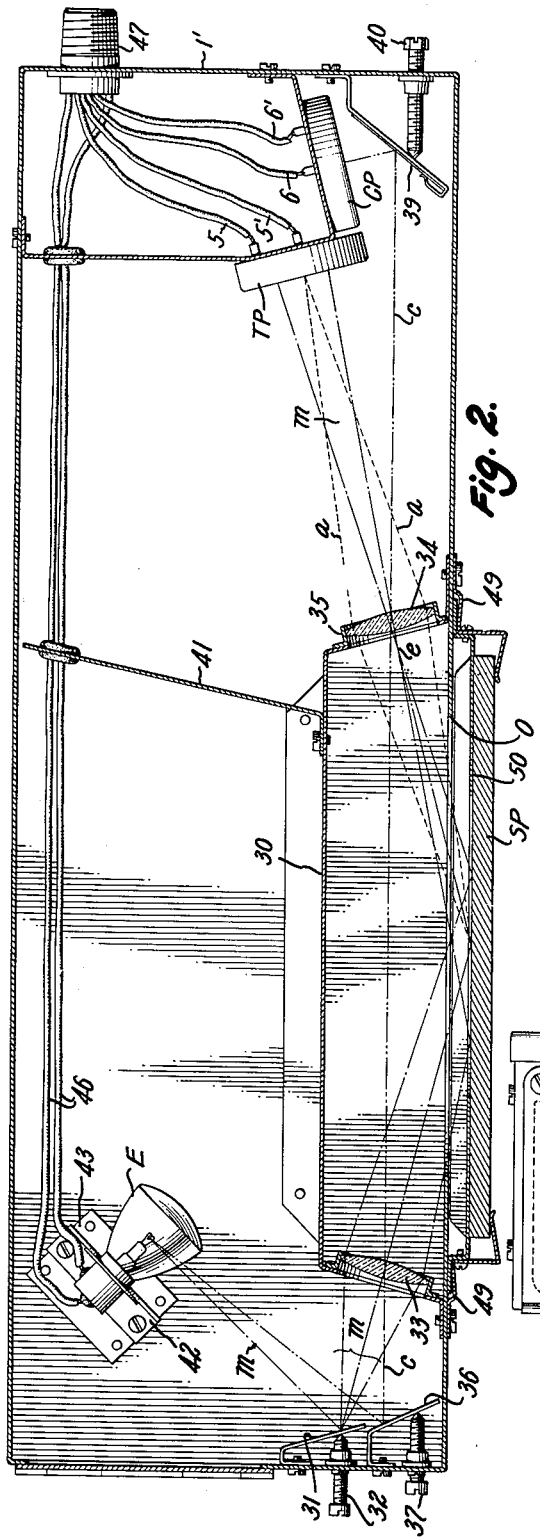
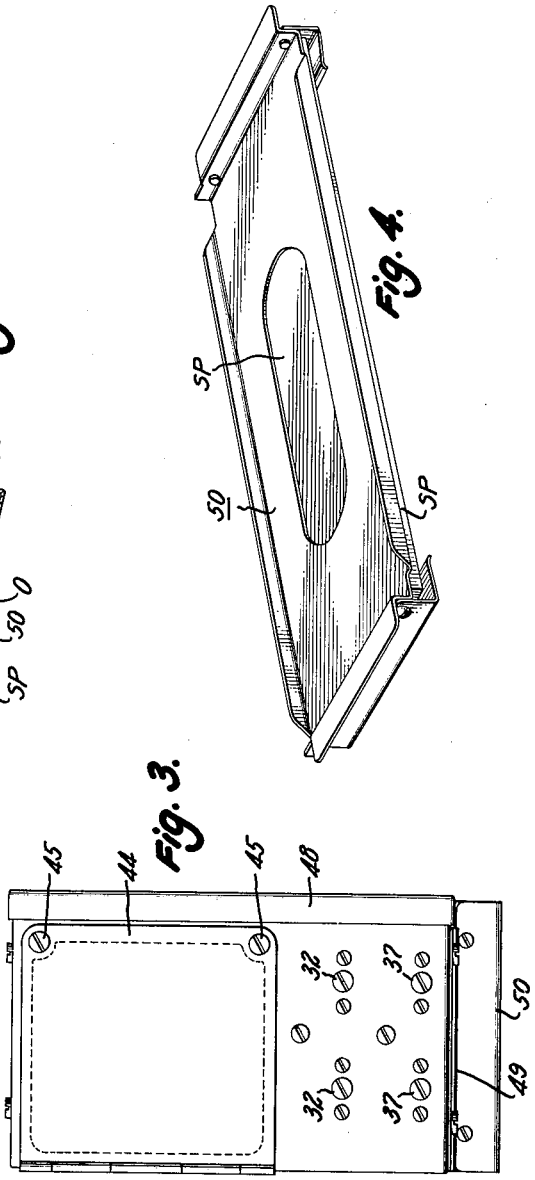

United States Patent Office 2,739,246
Patented Mar. 20, 1956

2,739,246

EXPOSURE HEAD FOR PHOTOMETRIC COMPARATOR INSTRUMENTS

Richard S. Hunter, Franklin Park, Va., assignor to Henry A. Gardner Laboratory, Inc., Bethesda, Md., a corporation of the District of Columbia Application June 8, 1950, Serial No. 166,943

10 Claims. (Cl. 250—220)

This invention relates to exposure heads for use in photometric comparator instruments, and more particularly to apparatus including a light source for illuminating a test specimen and a pair of photocells which develop, respectively, a comparison current of substantially fixed magnitude and a measuring current determined by and significant of an optical property of the test specimen.

This application is a continuation-in-part of my copending application Serial No. 77,887, filed February 23, 1949, now Patent No. 2,546,450 issued March 27, 1951 which describes and claims a photometric comparator instrument for measuring the gloss of paper, tile or other surfaces.

The exposure head for a glossmeter and for other photoelectric measuring instruments usually takes the form of a metal box housing a light source and two photocells; one photocell being directly illuminated by a beam from the light source and the other being illuminated by a beam which is reflected from a test specimen positioned closely adjacent an opening in the opaque wall of the metal box. Lenses and mirrors are employed to establish the paths of the light beams, and dust or lint may collect on these optical elements since it is not always practical to seal off the interior of the exposure head by a glass plate at the opening through which a light beam reaches, and is reflected from, the test specimen. In general, the light beams to the respective photocells of the prior exposure heads did not have coincident paths in portions of the optical system on which dust might collect and, for this and other reasons, frequent restandardization was necessary to obtain accurate readings of gloss or other optical properties of the test specimens.

Objects of the present invention are to provide exposure heads for photoelectric comparison instruments which render the instrument accuracy substantially independent of dust or other deposits on the optical elements of the exposure head. An object is to provide exposure heads in which two beams of light, whose respective transmission efficiencies affect the accuracy of measurement, have a path in common through all optical elements upon which dirt or other transmission affecting materials may be deposited. An object is to provide an exposure head in which the light source, the photocells and the beam-directing mirrors are protected from dust and lint by a domed partition which extends over the opening in the exposure head, and the significant light beams for measurement or calibration have a common path through lenses and/or glass plates mounted in the partition. An object is to provide an exposure head in which an image of the illuminated area of the test specimen is projected upon the face of a photocell, whereby the reflected light is distributed substantially uniformly over the photocell surface and the current response is therefore a more uniform function of reflected light than was the case with some prior exposure heads in which the area of photocell illuminated varied with the reflecting characteristics of the specimen. A further object is to provide an exposure head of the type stated in which a measuring photocell and a comparison photocell are positioned in close juxtaposition and therefore subject to the same temperature variations which affect the current outputs of the photocells.

These and other objects and the advantages of the invention will be apparent from the following specification when taken with the accompanying drawings in which:

Fig. 2 is a longitudinal section through another embodiment of the invention;

Fig. 3 is an end elevation of the same; and

Fig. 4 is a perspective view, with parts in section, of a standard specimen mounted in a frame.

Figure 1:
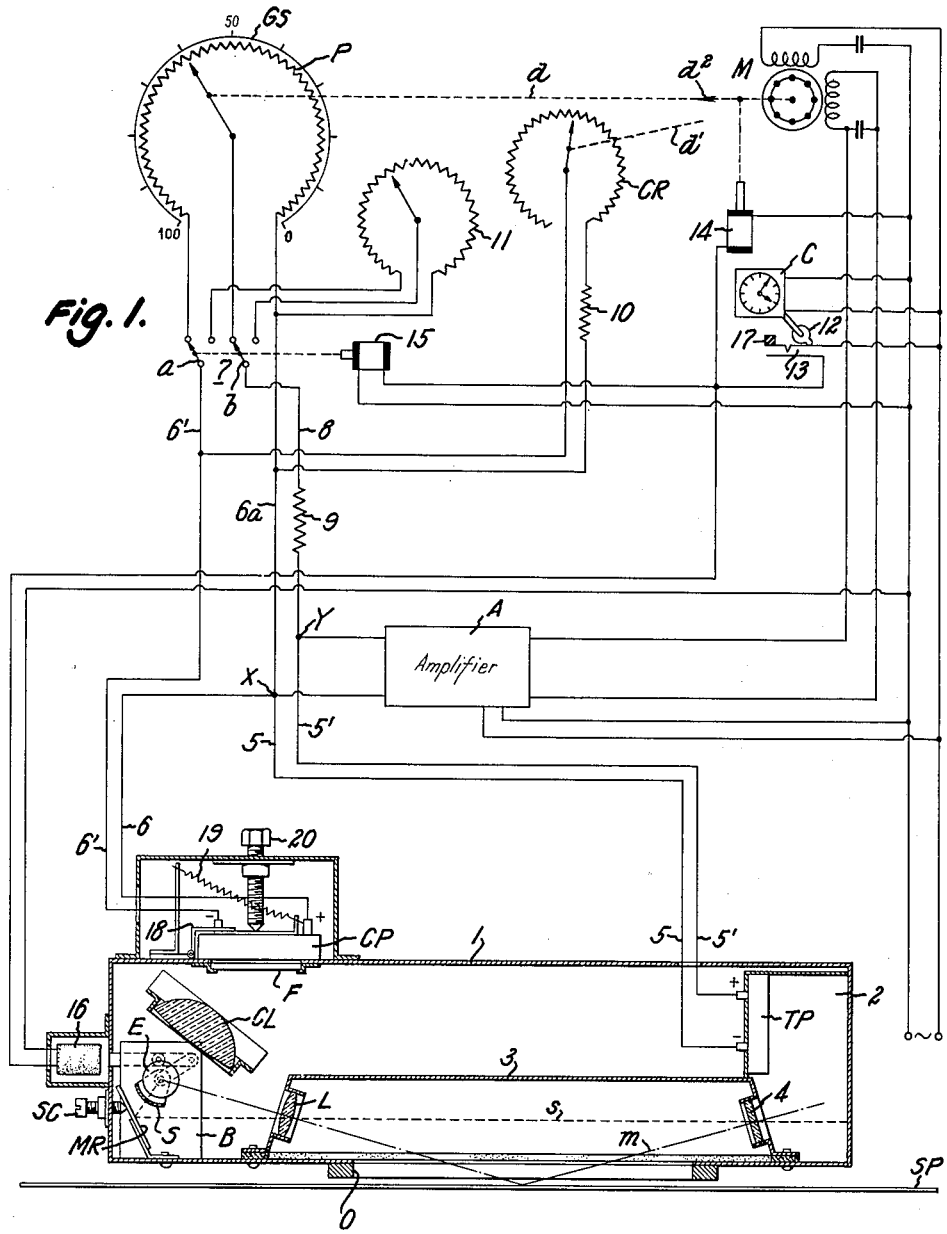
Fig. 1 is a schematic diagram of a glossmeter including an exposure head embodying the invention; the exposure head being shown in longitudinal section.

In the schematic diagram of Fig. 1, the reference numeral 1 identifies the elongated housing of a glossmeter exposure head having an opening in its lower wall beneath which a specimen SP may be placed for the measurement of gloss, or beneath which an extended web of material, for example paper in transit through a calender, may pass for the continuous measurement and/or recording of gloss of the web. The essential elements within the exposure head are a light source E or small electric lamp bulb, a comparison photocell CP which receives light directly from the source E, and a test photocell TP in a white diffusing enclosure or sub-housing 2 into which a measuring beam $m$ is reflected from the test specimen. The light beam $m$ passes through a lens L which is mounted across an exit aperture in an inner dust-excluding wall 3 of inverted shallow pan form, through opening O in the bottom wall of the exposure head to strike the test specimen SP at an angle of 75°. The beam $m$ is reflected from the specimen and enters the diffusing enclosure 2 through an entrance aperture or window 4 which is set in the inner wall 3.

The comparison photocell CP is positioned relatively close to the light source E and is directly illuminated by source E through a collimating lens CL and a heat-absorbing filter F. The light energy incident upon the comparison photocell CP is of the order of upward of one hundred times the light energy incident upon the test photocell.

An arcuate shutter S is supported on a bracket B for angular adjustment about the axis of the light source E; the shutter being movable counterclockwise from its illustrated position to another end position in which it interrupts the measuring beam $m$ and establishes a standardizing light beam $s$ to the test photocell TP. The standardizing beam $s$ is reflected through the lens L and window 4 by a small metal mirror MR which is adjustable by screw SC to center the beam upon the optical system. The light energy reaching the test photocell TP from the standardizing beam $s$ is substantially less than the light energy incident upon the comparison photocell.

The gloss of the specimen is measured in terms of the ratio of the currents generated by the photocells CP and TP, the photocells being of the barrier layer or current-generating type. The measuring circuit is of a balancing type in which the current outputs of the photocells are opposed and a voltage balance is obtained at the input terminals X, Y of an electronic amplifier A; an unbalance at the input terminals resulting in the energization of a reversible motor M to adjust the tap of a potentiometer P to vary the voltage developed across the amplifier input terminals X, Y by the current output of the comparison photocell CP.

The terminals of the test photocell TP are directly connected to the voltage balance points X, Y, by leads 5, 5' respectively, and one terminal of the comparison photocell CP is connected to balance point X by a lead 6; the polarity of the terminals of photocells CP and TP which are connected to point X being opposite, for example positive and negative, respectively, as indicated by symbols on the drawing. A jumper or lead 6a extends from the balance point X to one end of the potentiometer P, and the lead 6' from the other terminal of the comparison photocell CP is normally connected through blade a of a double pole—double throw switch 7 to the other end of the potentiometer P. The adjustable tap of potentiometer P is normally connected through blade b of switch 7, lead 8 and a high resistance 9 to the second balance point Y.

A portion of the current output of the comparison photocell CP is by-passed around the measuring potentiometer P by a fixed resistor 10 and adjustable calibrating resistor CR having a tap which may be driven by motor M through a drive, indicated schematically by broken line $d'$, when the normal motor drive $d$ to the tap of potentiometer P is broken simultaneously with an adjustment of switch 7 to its alternative position. This adjustment of switch 7 connects a standardizing potentiometer 11 across the comparison photocell leads 6', 6a in place of the measuring potentiometer P, and connects the tap of the potentiometer 11 to the amplifier input terminal Y.

The adjustment of the apparatus from a measuring to a calibrating operation may be made periodically by a clock mechanism C which is energized from the same power source PS, which may be a conventional 110 volt, 60 cycles light and power circuit, which energizes the amplifier A. In a continuous recorder, the clock mechanism also drives the record sheet, not shown, upon which a pen actuated by motor M traces a curve of the time-gloss characteristic of the specimen SP. As shown schematically, the clock mechanism C drives a cam 12 which periodically closes a switch 13 to energize solenoids 14, 15 and 16 which actuate, respectively, the coupling $d^2$ between motor M and drives $d$, $d'$, the switch 7, and the shutter S in the exposure head. Switch 13 is preferably provided with a button 17 which may be manually operated, as desired, to effect a recalibration.

The comparison photocell CP is supported within the exposure head on a hinged or flexible strap 18 which is biased away from the light source E by a spring 19 and may be adjusted towards the light source by a screw 20. The current output of the comparison photocell CP is in excess of the current established through the measuring potentiometer P, since a part of the photocell output is by-passed through the calibrating resistor CR and its series resistor 10. The adjustable mounting of photocell CP permits regulation of the total current output to that value which, for a correct setting of the standard potentiometer 11, establishes a voltage balance at points X and W when the contact arm of the calibrating resistor is at approximately mid-position. This condition is necessary since the calibration drift may be in either sense, and the compensating resistor CR must therefore afford adjustment in opposite directions.

The factory adjustment of the measuring circuit and exposure head comprises the steps of setting the contact arm of calibrating resistor CR to mid-point, placing a specimen SP of known gloss at the exposure head opening O, and adjusting the position of photocell CP, by means of screw 20, to bring the contact arm of measuring potentiometer P to the known gloss value on the scale GS. The amplifier A is then disconnected to prevent adjustment of the calibrating potentiometer CR, the shutter S is adjusted to establish the standardizing beam $s$ to photocell TP, switch 7 is thrown to connect the standard potentiometer 11 across the comparison photocell CP, and the contact arm of the standard potentiometer 11 is adjusted to balance the current developed by the standard beam $s$ against an equal current of opposite polarity derived from the comparison photocell CP through the potentiometer 11. The desired potential balance at points X and Y may be determined by a separate instrument, or by momentarily connecting the amplifier A across points X, Y to detect the sense of an unbalance. These steps are preferably repeated to check or to improve the adjustments of the position of photocell CP and of the standard potentiometer 11 for which the instrument reads correctly when the contact arm of the calibrating resistor is at or near its mid-point of its adjustment range.

These adjustments are made after the power circuit has been closed for sufficient time, say a half-hour or an hour, to establish stable temperature conditions at the photocell. Similarly, all measurements should be made only after the apparatus has been energized for some time.

During normal use of apparatus as shown in Fig. 1, for example for measurement of the gloss of paper coming from rolls of a supercalender stack, variations in gloss result in an unbalance across points X and Y in the measuring circuit, thereby energizing the motor M to adjust the contact arm of the measuring potentiometer P to re-establish the balance and to adjust the pen of the recording apparatus, not shown.

At intervals, the clock C closes the switch 13 which energizes the solenoids 14, 15 and 16 to establish the re-standardizing circuit, i. e. to shift the motor drive connection $d^2$ to the shaft of the calibrating resistor CR, to connect the standard potentiometer 11 across the photocell CP, and to establish the standard beam $s$ to the photocell TP. If there has been a drift in calibration since the previous re-standardization, the photocell inputs to the amplifier A will not be exactly equal and the motor M will be energized in proper sense to adjust the calibrating resistor CR to re-establish the balance. The purpose and effect of the calibrating adjustment is to bleed off or by-pass around the measuring potentiometer P a part of the current output of the comparison photocell CP such that the active current through the potentiometer P is a predetermined multiple of the current output of the test photocell TP when illuminated by the standard beam $s$.

The current output of the comparison photocell CP is of the order of 100 times that of the test photocell TP, and the fraction of the total current which is led off through the potentiometer tap to establish the voltage balance of the amplifier input terminals X, Y, is therefore small relative to the total current. The resistance 9 is relatively high, for example of the order of 8000 ohms, and the balancing current is therefore proportional to the setting of the potentiometer, which has a resistance of the order of 100 ohms, to within a few tenths of one percent. The potential across the test photocell TP is zero at the balance condition, and the test current is essentially a linear function of light reaching the photocell. Therefore the gloss of a specimen is proportional to the potentiometer setting to within a fraction of one percent.

Periodic standardizing or calibration is essential to maintain this high accuracy since the light-current characteristic of a barrier layer photocell varies with temperature, and a further calibration drift may arise from accumulations of dust and dirt on the lenses and window of the exposure head. The recalibrations restore the original accuracy since both the measuring beam $m$ and the standardizing beam $s$ pass through the same optical elements upon which dust or lint may collect. The particular design and construction of the recorder per se, including the electrical and mechanical devices for periodically shifting from the measuring to a standardizing operation, are not essential features of the present invention. As presently manufactured commercially, the clock mechanism of recording potentiometer instruments closes the self-standardizing switch every fifteen minutes, but other re-standardizing intervals may of course be selected.

The described measuring circuit has the advantage of high measuring sensitivity since the impedance of the measuring circuit, as seen from the balance-detecting system of amplifier A, is relatively high. High sensitivity is accompanied by instability which requires frequent recalibration since the photocells are spaced from each other and subject to different illuminations, thereby giving rise to variations in photocell temperatures which, in turn, affect the current outputs of the photocells. When maximum measuring sensitivity or accuracy is not essential, the necessity for frequent recalibrations may be eliminated by employing a photoelectric measuring circuit, as shown in Fig. 3 of Brice Patent No. 2,064,517, in which the current outputs of the comparison photocell and the test photocell may be of the same order of magnitude and the significant reading of the measuring circuit is the ratio of the current outputs. The Brice measuring circuit is basically of high stability and, with an exposure head as shown in Figs. 2 and 3, the photocells are subject to illuminations of the same order and are closely adjacent to eliminate temperature differences which would affect the measuring accuracy.

The exposure head comprises a casing or elongated metal box 1' of rectangular form with an inner or partition wall 30 cooperating with the side walls to form a dust-tight compartment above the opening O in the bottom wall. A chromium-surfaced metal mirror 31 is mounted on an end wall of the box 1' and is angularly adjustable by calibrating screws 32 to determine the path of the measuring light beam $m$ through an exit lens 33 over an opening in one end of the partition wall 30 and an entrance lens 34 mounted across and just beyond an opening 35 in the opposite end wall of partition 30. A test or measuring photocell TP is mounted within the exposure head housing 1' in position to intercept the measuring beam $m$ and is so spaced from the lens 34 that the light rays which pass through the entrance aperture 35 form an image of the illuminated area of the specimen SP, as is indicated by the convergence of the rays $a$ reflected from the center point of the illuminated area to focus at the center point on the photocell. The exit lens 33 forms an image of the filament of lamp E at a point $e$ very close to the exit lens 34, thereby avoiding erratic illumination of the surface of the specimen SP.

A second metal mirror 36 is mounted below mirror 31, and is adjustable by screws 37 to direct a comparison beam $c$ through the lenses 33, 34 upon a metal mirror 39 which is adjustable by screw 40 to reflect the comparison beam to a comparison photocell CP. A light shield 41 extends across the housing, above the dust wall 30, to prevent a direct illumination of the test photocell TP by the light source E.

The light source E is a pre-focused bulb such as used for automobile lighting, and the bulb socket 42 is supported upon a wall of the housing 1' by a bracket 43. The lamp socket is positioned adjacent an end wall, and the latter is provided with a hinged door 44 for access to the light bulb. The door is normally tightly closed upon the housing by screws 45 to prevent inadvertent admission of dirt and light. Leads 46 to the lamp socket, and leads 5, 5' and 6, 6' of the photocells extend to a cable connector 47 which is mounted on an end wall above the photocells. The front wall 48 of the housing 1' is removable, and is flanged along its edges to telescope over the adjacent wall to form a light-tight closure.

Clips 49 are secured to the lower wall of the housing to provide a guideway for receiving the flanges of a metal frame 50 carrying a standard specimen SP of known gloss. The exposure head is calibrated by installing a shiny black glass specimen, and adjusting the screw 40 until the measuring or recording instrument reading equals the known value for the black glass specimen. This adjustment may be checked by inserting a specimen of intermediate gloss value. The instrument reading should be correct for the known gloss value if the light beams are properly centered and the lenses are free from dust. The light beam positions are determined at the factory by adjustment of the mirrors 31 and 38, and these adjustments are stable and, in general, require no subsequent change even for lamp replacements when pre-focused lamp bulbs are used.

This exposure head has several advantages over the previously described embodiment in which the comparison photocell CP develops a current of a substantially higher order than that developed by the test photocell TP, the photocells in each instance being of the solid disk or "current generating" type. In the first place, the measuring or recording circuits may be much simpler when the photocells develop currents of the same order of magnitude and are so closely positioned as to be subject to the same temperature variations. The elements of the Fig. 1 circuit which are required for frequent restandardization are no longer necessary as the measuring system is of high stability.

A further advantage results from the optical system which projects an image of the surface under measurement upon the outer or collector electrode surface of the test photocell TP. This insures a substantially equal photocell response for every light ray passing through the entrance aperture 35 whether the light ray passes through the center or an edge of the window opening. The surfaces of the majority of materials met in practice are not optically smooth but are more or less granular or wavy, and the specular reflection of light rays by the surface facets of different materials gives rise to an infinite variety of distributions of the rays of a reflected light beam. The rays of the incident beam in a glossmeter exposure head are not all parallel to the axis of the beam, and there is usually a greater divergence from parallelism in the rays of the light beam reflected from the surface of the specimen under test. A nearly level surface will concentrate the rays of the reflected beam in and near the direction of mirror reflection whereas a rough surface will quite completely diffuse the reflected light. In general, the bundle of rays reflected through the receptor entrance aperture 35 includes rays having the direction of mirror reflection and other rays, such as indicated by rays $a$, $a$ of Fig. 2 which diverge from the axis of a mirror-reflected beam. In accordance with the invention, each unit light ray which passes through the receptor entrance aperture 35 develops substantially the same unit current response at the measuring photocell TP. This operational characteristic results from the provision of the receptor lens 34 to focus an image of the illuminated area of the specimen SP upon the surface of the photocell TP, thus insuring a substantially uniform illumination over the entire photocell surface. In prior glossmeter exposure heads in which the photocell TP was located closely adjacent the receptor entrance aperture 35, the distribution of light energy over the photocell surface was non-uniform. The current response of a photocell varies somewhat, for a given incident light energy, with the geometrical distribution of the light energy over the sensitive surface of the photocell; the response being greater for a uniform illumination than for a non-uniform illumination of the photoelectric element.

It is the total light energy reflected through the receptor entrance aperture 35 which varies with the gloss of a specimen, and the optical system of Fig. 2 affords a measure of the light energy at receptor entrance aperture 35 which varies with the quantity and not the distribution of the light rays. It has been demonstrated that different operators can obtain more "reproducible readings" for the same specimen with glossmeters having exposure heads as illustrated in Figs. 2 and 3 than with exposure heads of prior types in which the optical systems did not form images of the illuminated area upon the photocell. The improvement in uniformity of measurements by different operators employing different glossmeters is of major practical value since the utility of a glossmeter depends upon the uniformity or reproducibility of gloss readings on the same specimens by manufacturers, their customers and testing laboratories.

The exposure head of Figs. 2 and 3 has the further advantage of a higher current output from the measuring photocell than is possible with a white-walled diffusing chamber 2 such as shown in Fig. 1. The diffusing chambers are inefficient and unstable as the walls tend to become dirty and to darken, thereby absorbing some of the light energy before it reaches the photocell. The optical system which forms an image of the illuminated area of a specimen on or at a photoelectric device may be incorporated in an exposure head of Fig. 1 apparatus and in other photoelectric measuring apparatus in which the magnitude of a factor varies with the total light energy incident upon a photoelectric cell or tube and is independent of the geometrical distribution of the light energy.

It is therefore to be understood that the invention is not limited to the constructions herein shown and described, and that various modifications of the exposure heads which may occur to those familiar with this art fall within the spirit and scope of the invention as set forth in the following claims.

I claim:

1. An exposure head for use with a photoelectric comparator instrument; said exposure head including an elongated housing with an opening in one longitudinal wall thereof, a light source within said housing, a comparison photocell illuminated by said light source, a test photocell, means for directing a test beam of light rays from said light source to said opening and at an acute angle to the plane of the wall having said opening therein whereby light rays will be reflected from a test specimen positioned at said opening, said light source being positioned at one end of said elongated housing and; said test photocell being positioned at the opposite end of said housing in the path of the reflected light rays, a dust-tight partition wall within said housing and extending over the opening thereof, said partition wall forming with said housing a dust-tight chamber within which said light source and said photocells are located, said partition wall having entrance and exit apertures therethrough for the passage of said test beam of rays to said opening and by reflection through said opening to said test photocell, and transparent means at said apertures to pass said test beam of rays and prevent entrance of dust into said chamber; the transparent means at the exit aperture being a lens for concentrating the test beam of rays upon a specimen at the housing opening, and the transparent means at the entrance aperture being a lens forming on the test photocell an image of the illuminated area of a specimen at said housing opening.

2. An exposure head as recited in claim 1, in combination with mirror means adjustable to vary the light energy incident upon said comparison photocell; said mirror means comprising a mirror within the housing and supported on a wall thereof, and a screw extending through the said wall and adjustable from the exterior of the housing to vary the inclination of the said mirror.

3. An exposure head as recited in claim 1, wherein said housing is elongated with said light source at one end thereof, said comparison photocell and said test photocell are located in proximity at the other end of said housing, and means is provided for illuminating said comparison photocell by a beam of rays transmitted through said transparent means incorporated in said partition wall.

4. In an exposure head for a photoelectric comparator instrument, an elongated housing having an opening in one wall thereof at which a test specimen may be positioned, a dust-tight partition wall within said housing and over said opening to form a dust-tight chamber within said housing, a light source within said chamber, a comparison photocell and a test photocell within said chamber, said partition wall having apertures for the passage of a test beam of rays to said housing opening and by reflection from a test specimen to said test photocell, transparent means mounted at said apertures and sealing said chamber against dust entering through said housing opening, and means for directing another beam of rays through said transparent means to one of said photocells, whereby both of said beams are attenuated to the same degree by dust deposited on said transparent means.

5. In an exposure head, the invention as recited in claim 4, wherein said beam-directing means includes a shutter adjustable to block passage of the test beam to said test photocell and simultaneously to direct said other beam of rays to said test photocell.

6. In an exposure head, the invention as recited in claim 4, wherein said beam-directing means includes adjustable mirrors for reflecting said other beam of rays to said comparison photocell.

7. An exposure head for use in a photoelectric comparator instrument, said exposure head including a housing having an opening in one wall thereof, a light source within the housing, a comparison photocell illuminated by said light source, a test photocell, means for directing a beam of rays from said light source to said opening for reflection from a test specimen positioned thereat to said test photocell, and beam-control means adjustable to block illumination of said test photocell by reflection from a test specimen at said opening and to impose thereon a standard beam of light rays derived from said light source.

8. An exposure head as recited in claim 7, wherein said beam-controlling means includes a shutter movable to interrupt the beam of rays from said source to said opening and to establish an independent light path from said light source to said test photocell.

9. An exposure head as recited in claim 7, in combination with a partition dividing said housing into a dust-tight compartment housing said light source and said beam-control means and a second compartment communicating with atmosphere through said opening, said means for directing a beam of rays to said opening comprising a lens mounted in said partition and a transparent window in said partition for passing the reflected beam of rays to the test photocell; and wherein said beam-control means includes a mirror for reflecting the standard beam of rays to said test photocell through said lens and transparent window, and a shutter movable between alternate positions to block a beam of rays from said light source to said lens or alternatively a beam of rays to said mirror.

10. An exposure head for use with photoelectric apparatus for gloss measurements, said exposure head comprising a housing with an opening in one wall thereof at which a test specimen may be positioned, a light source within said housing, means for directing a beam of light rays from said source through said opening to illuminate the surface of a test specimen at the opening, a lens within said housing and positioned in the path of light rays specularly reflected from the surface of the test specimen, said lens having such refracting power that it forms within the housing an image of the illuminated area of the specimen, and a photoelectric cell of current generating type positioned with its collector electrode surface in the plane of said image.

References Cited in the file of this patent

UNITED STATES PATENTS

| 2,096,902 | Lamb | Oct. 26, 1937 |
| 2,215,211 | Devol | Sept. 17, 1940 |
| 2,237,811 | Cockrell | Apr. 8, 1941 |
| 2,427,013 | MacAdams | Sept. 9, 1947 |
| 2,430,526 | Mirfield et al. | Nov. 11, 1947 |
| 2,438,588 | Tolson | Mar. 30, 1948 |
| 2,445,041 | Scholz | July 13, 1948 |
| 2,471,750 | Hunter | May 31, 1949 |
| 2,546,450 | Hunter | Mar. 27, 1951 |